United States Patent [19]

Walls

[11] 4,376,814

[45] Mar. 15, 1983

[54] CERAMIC DEPOSITION ON ALUMINUM

[75] Inventor: John E. Walls, Annandale, N.J.

[73] Assignee: American Hoechst Corporation, Somerville, N.J.

[21] Appl. No.: 359,455

[22] Filed: Mar. 18, 1982

[51] Int. Cl.$^3$ .......................... G03C 1/94; B32B 9/06; G03C 1/52

[52] U.S. Cl. .................................... 430/272; 428/469; 430/159; 430/161; 430/276; 430/278; 430/302

[58] Field of Search .............. 430/159, 160, 161, 153, 430/271, 272, 276, 278, 302; 428/433, 469, 457

[56] References Cited

U.S. PATENT DOCUMENTS

| | | | |
|---|---|---|---|
| 2,714,066 | 7/1955 | Jewett et al. | 430/159 X |
| 2,922,715 | 1/1960 | Gumbinner | 430/159 |
| 2,946,683 | 7/1960 | Mellan et al. | 430/161 |
| 3,030,210 | 4/1962 | Chebiniak | 430/161 |
| 3,136,636 | 6/1964 | Dowdall et al. | 430/155 X |
| 3,160,506 | 12/1964 | O'Connor et al. | 430/161 |
| 3,307,951 | 3/1967 | Adams et al. | 430/271 |
| 4,153,461 | 5/1979 | Berghauser et al. | 430/160 |

*Primary Examiner*—Thomas J. Herbert, Jr.
*Attorney, Agent, or Firm*—Richard S. Roberts

[57] ABSTRACT

An aluminum substrate is electrochemically or thermally deposited with a ceramic surface coating comprising an organic acid, such as polyvinyl phosphonic acid, and an alkaline earth silicate or borate.

19 Claims, No Drawings

CERAMIC DEPOSITION ON ALUMINUM

BACKGROUND OF THE INVENTION

The present invention relates to aluminum or aluminum alloy surfaces which are treated with corrosion resistant ceramic type compounds so as to be useful as dielectrics and substrates for subsequently applied coatings. More particularly, the hydrophilic surfaces thusly produced are suitable for use as base supports for lithographic printing plates.

Heretofore, in the production of metal presensitized lithographic printing plates, it had been found beneficial to treat the surface of the metal substrate sheet, with a protective interlayer substance which imparts beneficial characteristics to the final lithographic printing plate thus produced. The prior art teaches that it is desirable to treat the metal sheet substrate surface receiving the light sensitive coating material, which when exposed to light and developed becomes the printing surface of the printing plate, with an undercoating substance that hydrophilizes the substrate and forms a strong bond with the metal sheet substrate and with the light sensitive coating material.

Many such undercoating treatments are known in the art for manufacturing longer running lithographic plates. U.S. Pat. Nos. 3,160,506, 3,136,636; 2,946,683; 2,922,715 and 2,714,066 disclose a variety of suitable materials for undercoating bonding substances onto plates and methods for applying them. Alkali silicate, polyvinyl phosphonic acid, silicic acid, alkali zirconium fluoride and hydrofluozirconic acid solutions presently are the most important commerical bonding substances. Those materials substantially improve the bonding of the light sensitive coating to the underlying metallic base which otherwise generally tends to have inadequate affinity for the coating.

The application of silicates both electrically and thermally, is well known to be a method of producing a ceramic-like layer on aluminum and its alloys which is non-porous and hydrophilic and is particularly useful for wipe-on plates and to a lesser degree, presensitized lithographic printing plates. The advantages most realized in the silicate process are the quick roll-up due to the glass-like nature of the surface and the ability to set for extended periods of time without loss of hydrophilicity before the photosensitive coating is applied. However, due to the alkaline nature of the sodium silicate used, it is not always possible to have a consistently good presensitized printing plate, even when well rinsed, and then coated with diazonium compounds.

Also, rinsing is critical especially in the case of thermal silication where copious amounts of water are needed. Electrosilication is more forgiving in that a mild acid rinse may be used. Finally, sodium silicate may not be made acidic since an insoluble silisic acid precipitate is formed.

Various borates, phosphates and the fluoro derivatives thereof are also known to be useful when thermally applied. U.S. Pat. No. 4,153,461 teaches that aqueous solutions of organic acids are useful in the production of substrates which form the base of lithographic printing plates. The most preferred such acid is polyvinyl phosphonic acid.

Polyvinyl phosphonic acid treatment offers the advantage of producing a surface that is acidic and therefore inherently compatible with diazonium compounds. Both thermal and electrical techniques provide better adhesion between the aluminum and applied light sensitive coating which translate into better press performance. The advantages of such compounds are that they provide chemical bonding to the aluminum and diazonium compounds in the coating, by covalent bonding in the former case and ionic bonding in the latter, and that they result in presensitized lithographic printing plates having excellent shelf lives. Some disadvantages of surfaces prepared with these compounds are: (1) the prepared surface can not set too long between the time it is manufactured and it is coated; (2) the inherent hydrophilicity is not as great as silicated plates; (3) the ability to roll up clean and remain clean, particularly after the press has run and then shut down, is not always realized.

It is an object of the present invention to provide a technique whereby the aforesaid advantages of both the acid and ceramic treatments are substantially attained and the undesirable features are substantially negated.

SUMMARY OF THE INVENTION

The present invention provides an article comprising an aluminum sheet, and a coating on said sheet, said coating comprising a composition produced by the method of:

(a) admixing a compound selected from the group consisting of silicates, tetraborates and pentaborates having monovalent cations, with (b) the product obtained by titrating an aqueous solution of one or more compounds selected from the group consisting of organic sulfonic, phosphonic, phosphoric, and tribasic or higher functionality carboxylic acids with a monovalent alkali until an alkaline pH is attained, provided said titration product is selected such that it does not form a precipitate with the compound of part (a).

The coating on the aluminum sheet may have such uses as a corrosion resistant surface, a dielectric, a barrier layer, or as a layer which adheres to photosensitive coatings in the production of lithographic printing plates.

DETAILED DESCRIPTION OF THE PREFERRED EMBODIMENT

As used herein, the term aluminum means webs and sheets comprising major amounts of aluminum, particularly those alloys containing 98% or more aluminum as are commonly used to produce lithographic printing plates. It also includes such sheets which may have been subjected to surface treatments including degreasing, etching, graining and anodizing, among others, via mechanical, chemical and electrochemical methods which are well known to the skilled artisan.

It has been found that by treating at least one surface of an aluminum sample, as defined above, with the ceramic forming composition of the present invention, that the aluminum surface is provided with advantageous properties which render the overall structure suitable for such uses as substrates for lithographic printing plates and as parts of capacitors.

In preparing the coating composition of the present invention, one begins with an aqueous solution of an organic acid and titrates it with a monovalent alkali until an alkaline pH is reached. Such organic acids include sulfonic, phosphonic, phosphoric and tribasic or higher functionality carboxylic acids. Those acids which are polymeric are preferred.

Examples of organic acids that are usable for the preparation of lithographic printing plates are polyvinyl phosphonic acid, phytic acid, polyvinyl sulfonic acid, polyvinyl methyl ether maleic anhydride copolymer, and 2-ethyl hexyl polyphosphoric acid.

Other acids that are suitable for the improvement of corrosion resistance are mellitic acid, pyrromellitic acid, polybenzene phosphonic acid, polystyrene sulfonic acid, polydiisopropyl benzene sulfonic acid, polyacrylic acid and polymethacrylic acid.

The acid is then titrated with a monovalent alkali until an alkaline pH is reached. Examples of such compounds include potassium, lithium, sodium and ammonium hydroxide. Divalent and trivalent cations as hydroxides are not particularly suitable. They tend to result in an insoluble precipitate. Therefore, monovalent cations are preferred. It is also preferred that the titration continue until a pH of at least about 8.0, preferably from about 8.0 to about 10.0 is attained. It is also important that the acid be selected and the titration be conducted to a pH such that the titration product is an aqueous solution and that no precipitate is formed when such titration product is admixed with the silicates and/or borates in the coating composition.

The thusly formed titration product is then admixed with compatible silicates and borates to produce an aqueous solution.

Silicates may be the salts of sodium, potassium and lithium. Silicates are most useful with a $SiO_2$ to $Na_2O$ ratio of 1:1 or greater, preferably at least 2.0:1 and more preferably 2.5:1 and higher. For lithographic applications, sodium silicate (Star Brand sold by Philadelphia Quartz), sodium fluoroborate, and sodium metaborate are the best suited. The lithium, potassium and ammonium analogs are equally acceptable. For improved corrosion resistance, other suitable compounds are ammonium pentaborate, potassium tetraborate, and sodium borate. In general, sodium, lithium, potassium and ammonium tetraborates and pentaborates are preferred.

In the preferred embodiment, one begins with an aqueous solution of the acid at a concentration of from about 1 to about 80 grams/liter, more preferably from about 5 to about 40 g/l and most preferably from about 10 to about 20 g/l. The acid is then titrated to an alkaline pH or more preferably to a pH of from about 8.0 to about 10.0 with a monovalent alkali. This titration product is then admixed with the silicate or borate at a concentration of from about 5 to about 120 grams/liter, more preferably from about 15 to about 80 g/l and most preferably from about 40 to about 70 g/l. One highly preferred embodiment employs 10 g/l of polyvinyl phosphonic acid titrated to a pH of 9.5 with ammonium hydroxide and admixed with 70 g/l of sodium silicate having an $SiO_2$ to $Na_2O$ ratio of 2.5:1.

The thusly formed coating composition is then employed to treat the subject aluminum sheet. This may be done either chemically or electrochemically although electrochemical treatment produces a preferred surface. One may prepare the aluminum surface in a variety of ways known to the skilled artisan such as degreasing to remove milling oils, etching with caustics, graining with slurries, chemical or electrochemical treatments followed with a rinse. If a chemical coating procedure is chosen, one may, for example, spray or dip the aluminum into the coating solution which is maintained at a temperature of from about 60° C. to about 100° C., preferably 75° C. to 100° C. and more preferably 85° C. to about 100° C. Treatment time should be at least about 30 seconds and no additional surface benefit is noticed after about 60 seconds of treatment.

If an electrodeposition procedure is chosen, the aluminum is made an anode and is immersed in a bath of the coating solution. The solution temperature is maintained in excess of its freezing point and preferably up to about 90° C., more preferably from about 10° C. to about 60° C. and most preferably from about 20° C. to about 30° C. A cathode is also immersed in the solution such that the cathode to anode distance is from about 2 to about 75 cm., preferably from about 5 to 25 cm. and most preferably 10 to 15 cm.

The voltage applied is direct or pulsed current from about 1 to about 120 volts or higher as long as arcing is avoided, preferably from about 10 to 90 volts and most preferably from about 20 to 30 volts. The current density per square decimeter of aluminum preferably ranges from about 3 to about 30 $A/dm^2$. The surface thus produced is best when acid rinsed to recreate the free acid from the salt, although the surface is functional with just water rinsing.

It is understood that the foregoing parameters are necessarily interdependent and various combinations and modifications of said parameters are operable in the context of the present invention. The hereinbefore mentioned parameters are specifically not intended to limit the scope of the instant invention.

In the production of lithographic printing plates, the thusly treated aluminum surface is coated with a lithographically suitable photosensitive composition. The printing plate is exposed through a photographic mask, developed, and employed on a printing press to make multiple reproductions of the photomask image.

The photosensitive compositions which may be satisfactorily employed in the practice of this invention are those which are lithographically suitable and are actinic and ultraviolet light reactive. The photosensitive compositions which may be employed in the practice of this invention are those which are negative or positive acting and include such negative acting photosensitive agents as diazonium salts and photopolymerizable compositions; and such positive acting photosensitive agents as aromatic diazo-oxide compounds, for example, benzoquinone diazides, naphthoquinone diazides.

The most satisfactory photosensitive agent may be selected by the skilled worker, depending upon the results sought to be achieved.

The photosensitive composition may also contain such ingredients as binding resins, for example polyvinyl formals and phenol formaldehyde resins. It may also contain ingredients such as surfactants, UV absorbers, colorants and fillers as are well known to the skilled artisan.

The optimum proportion of each ingredient and selection of particular composition naturally depends on the specific properties desired in the final lithographic plate. It has been found that lithographic plates made in accordance with the present invention display a significant improvement in dry inking, wet inking, image adhesion, aging of the uncoated surface, contact angle and $SnCl_2$ resistance compared to the surface produced with the individual ingredients.

The following examples are provided to illustrate the operation of the present invention and in no way limits its scope.

EXAMPLE 1

Several sections of grade 3003 alloy aluminum (18×19×0.05 cm) were prepared by degreasing the sections with Ridoline 5354 (manufactured by Amchem, Media, Pa.), an inhibited alkaline degreaser, in the prescribed manner.

The degreased section of aluminum was then etched with a 1.0 N NaOH solution at room temperature for 20 seconds.

After etching, the aluminum plate was thoroughly rinsed with water and immediately placed in an electrically insulated tank containing a 1.0 (w/w) solution of polyvinyl phosphonic acid (PVPA). On each side of the aluminum was placed a lead electrode with dimensions corresponding to the aluminum plate. The electrodes were equidistant from the aluminum with a gap of 10.0 cm.

Using D.C. output, the aluminum was made anodic and the lead electrodes were made cathodic. The temperature of the bath was maintained at 25° C. The power was turned on with the voltage pre-set at 30VCD. 1280 coulombs were used to generate a film of 350 mg/m$^2$ (determined by standard $H_3PO_4/H_2CrO_4$ solution using ASTM methods). The treated plate was well rinsed and blotted dry.

Several drops of a saturated solution of stannous chloride were placed on the surface. The stannous chloride reacts with the aluminum once it has migrated through the layer generated by the electrochemical process. Discrete black spots of metallic tin signal the end of the test.

The surface produced as described required 101 seconds for the $SnCl_2$ to totally migrate through the electrodeposited surface film. By using a dry-ink method to assess the hydrophilicity, the surface was easily cleansed of ink with light water rinsing. Similarly produced plates were aged at room temperature. After 7 days, one was dry inked. The ink was removable. It become more difficult at 10 days and was not at all removable after 14 days.

The plate was coated with a solution containing a pigment, polyvinyl formal binder and a diazonium condensation product of U.S. Pat. No. 3,867,147. When exposed through a negative test flat, developed with an aqueous alcohol developer and run on a sheet-fed press, 70,000 acceptable copies were achieved. On several occasions during the press run, the fountain solution was removed thereby allowing the plate to roll-up solid with ink. The dampening roll was reapplied and the observation was made as to how fast and fully the ink was removed from the background. The first time the ink removed satisfactorily; the second time, the removal was slower, but was total. The third time this was tried it scummed and it was not possible to again obtain an acceptable print. It was necessary to use a cleaning solution to clean the background before quality printing could continue.

Another section of plate was coated with the aforementioned coating 48 hours after being prepared as also previously described. The plate was cut into pieces, all of which were aged at 100° C. with samples being taken and evaluated every 30 minutes. The thusly detail product was good for 4½ hours.

EXAMPLES 2 THROUGH 14

Using the test methods given in Example 1, the following examples are illustrative of the techniques of the invention and compare results to those obtained by known processes.

Example 2 follows the individual stated conditions and the procedure of example 1 except an immersion rather than an electrolysis in PVPA is conducted.

Example 3 follows the individual stated conditions and the procedure of example 2 except sodium silicate is used.

Example 4 follows the individual stated conditions and the procedure of example 1 except electrolysis is conducted in a sodium silicate solution.

Example 5 follows the individual stated conditions and the procedure of example 1 for a composition comprising the titration product of PVPA and ammonium hydroxide.

Examples 6, 8, 9, 12 and 14 follows the individual stated conditions and the procedure of example 1 except the compositions of the present invention form the electrolyte.

Examples 7 and 10 follows the individual stated conditions and the procedure of example 2 except the compositions of the present invention comprise the immersion bath.

Example 11 follows the individual stated conditions and the procedure of example 1 except a temperature below that which is usually desired is employed.

Example 13 follows the individual stated conditions and the electrolyte of example 10.

From these examples, the improvement provided by the present invention can clearly be seen over previously known techniques. These known methods are illustrated in Examples 1 through 4. Examples showing good run length and aging of the coated plate are seen in cases 1 and 2 where polyvinyl phosphonic acid is used as the sole solution ingredient. Those having good aging of the uncoated substrate and good scum cycle testing, indicating high hydrophilicity, are seen in Examples 3 and 4 where sodium silicate is employed. In order to confirm that pH is not the significant parameter, the conditions of Example 1 are duplicated in Example 5 except that the pH was adjusted to 9.5 with ammonium hydroxide. The surface produced was clearly unacceptable.

It is observed in Example 12 where a composition of the present invention is used electrically and can be directly compared to Examples 1 and 4, that all results are more advantageously produced. Conversely, the same solutions when used in a thermal immersion as shown in Example 10 demonstrates an improvement over Examples 2 and 3.

Examples 10 through 13 use the same solution contrasted to demonstrate the importance of elevated temperatures for the immersion process and lower temperatures for the electrical application. Although being acceptable overall, the process carried out with electricity is noticeably better when performed at lower temperatures while the immersion process improves at increased temperatures. Examples 6–9 and 14 illustrate alternate embodiments of the invention employing either an electrolytic or immersion process.

| Example No. | Aqueous Solution | Conditions | Oxide Wt. ($mg/m^2$) | $SnCl_2$ (Seconds) | Aging R.T. for Substrate (Days to Failure) | Run Length | Scum Cycle (No. cycles to background failure) | 100° C. Aging (Hrs.) |
|---|---|---|---|---|---|---|---|---|
| 2 | 2.0 g/l PVPA | 65.5° C. for 30 seconds immersion | 37.0 | 10 | 9 | 55,000 | 2nd | 3½ |
| 3 | 70 g/l $Na_2SiO_3$ | 82.2° C. for 60 seconds immersion | not determinable (predicted to be ≈ 25) | 10 | >30 | 25,000 | 5th | ¾ |
| 4 | 70 g/l $Na_2SiO_3$ | 82.2° C. w/30 VDC 1800 coulombs | not determinable (predicted to be ≈ 250) | 155 | >60 | 35,000 | 9th | 1½ |
| 5 | 10 g/l PVPA titrated to pH 9.5 w/$NH_4OH$ | 25° C. VDC 1280 coulombs | 87 | 38 | 1 | PLATE NOT SUITABLE FOR THESE TESTS DUE TO BACKGROUND SCUMMING | | |
| 6 | 10 g/l PVPA titrated to pH 9.5 w/$NH_4OH$ + 50 g/l potassium pentaborate | 25° C. VDC 720 coulombs | 273 | 158 | >30 | 70,000 | 7th | 4 |
| 7 | 10 g/l PVPA titrated to PH 9.5 w/$NH_4OH$ + 50 g/l potassium pentaborate | 65.5° C. for 30 seconds immersion | 36 | 11 | 22 | 50,000 | 3rd | 2 |
| 8 | 25 g/l Phytic acid titrated to pH 9.5 w/NaOH + 50 g/l sodium fluoroborate | 25° C. 30 VDC 945 coulombs | 335 | 147 | 30 | 65,000 | 6th | 3½ |
| 9 | 25 g/l Phytic acid titrated to pH 9.5 w/NaOH + 50 g/l sodium fluoroborate | 82.2° C. 30 VDC 1030 coulombs | 317 | 131 | 24 | 60,000 | 5th | 3 |
| 10 | 10 g/l PVPA titrated to pH 9.5 w/$NH_4OH$ + 50 g/l $Na_2SiO_3$ ($SiO_2$:$Na_2O$ = 2.5:1) | 65.5° C. 30 seconds immersion | 42 | 12 | 30 | 45,000 | 5th | 2 |
| 11 | 10 g/l PVPA titrated to pH 9.5 w/$NH_4OH$ + 50 g/l $Na_2SiO_3$ ($SiO_2$:$Na_2O$ = 2.5:1) | 25° C. 30 seconds immersion | 18 | 7 | 3 | 20,000 | 2nd | 1 |
| 12 | 10 g/l PVPA titrated to pH 9.5 w/$NH_4OH$ + 50 g/l $Na_2SiO_3$ ($SiO_2$:$Na_2O$ = 2.5:1) | 25° C. 30 VDC 1920 coulombs | 416 | 174 | >60 | 75,000 | 9th | 4½ |
| 13 | 10 g/l PVPA titrated to pH 9.5 w/$NH_4OH$ + 50 g/l $Na_2SiO_3$ ($SiO_2$:$Na_2O$ = 2.5:1) | 65.5° C. 30 VDC 2040 coulombs | 370 | 139 | >30 | 65,000 | 7th | 3½ |
| 14 | 15 g/l polyvinyl methyl ether/maleic anhydride titrated w/KOH to pH 9.5 + potassium tetraborate | 25° C. 30 VDC 1960 coulombs | 345 | 154 | >60 | 70,000 | 8th | 3½ |

What is claimed is:

1. An article comprising an aluminum sheet, and a coating on said sheet, said coating comprising a composition produced by the method of (a) admixing a compound selected from the group consisting of silicates, tetraborates and pentaborates having monovalent cations, with (b) the product obtained by titrating an aqueous solution of one or more compounds selected from the group consisting of organic sulfonic, phosphonic, phosphoric and tribasic or higher functionality carboxylic acids with a monovalent alkali until an alkaline pH is attained provided said titration product is selected such that it does not form a precipitate with the compound of part (a).

2. The article of claim 1 wherein said acid is selected from the group consisting of mellitic acid, pyrromellitic acid, polybenzene phosphonic acid, polystyrene sulfonic acid, poly diisopropyl benzene sulfonic acid, polyacrylic acid and poly methacrylic acid.

3. The article of claim 1 wherein said compound (a) comprises a compound selected from the group consisting of sodium, potassium and lithium silicate.

4. The article of claim 1 wherein said compound (a) comprises a compound selected from the group consisting of ammonium pentaborate and potassium tetraborate.

5. The article of claim 1 wherein said acid is selected from the group consisting of polyvinyl phosphonic acid, phytic acid, polyvinyl sulfonic acid, polyvinyl methyl ether maleic anhydride copolymer and 2 ethyl hexyl polyphosphoric acid.

6. The article of claim 5 wherein said compound (a) comprises a compound selected from the group consisting of sodium, potassium and lithium silicate.

7. The article of claim 5 wherein said alkali comprises a compound selected from the group consisting of sodium, lithium, potassium and ammonium hydroxide.

8. The article of claim 7 wherein said compound (a) comprises a compound selected from the group consisting of sodium, potassium and lithium silicate.

9. The article of claim 1 or 8 further comprising a lithographically suitable photosensitive composition applied to said coating.

10. The article of claim 1 wherein said alkali comprises a compound selected from the group consisting of sodium, lithium, potassium and ammonium hydroxide.

11. The article of claim 10 wherein said compound (a) comprises a compound selected from the group consisting of sodium, potassium and lithium silicate.

12. A method for producing an article comprising treating an aluminum sheet for at least about 30 seconds with a coating composition having a temperature in the range of from about 60° C. to about 100° C., said coating comprising a composition produced by the method of (a) admixing a compound selected from the group consisting of silicates, tetraborates and pentaborates having monovalent cations, with (b) the product obtained by titrating an aqueous solution of one or more compounds selected from the group consisting of organic sulfonic, phosphonic, phosphoric and tribasic or higher functionality carboxylic acids with a monovalent alkali until an alkaline pH is attained provided said titration product is selected such that it does not form a precipitate with the compound of part (a).

13. The method of claim 12 wherein said acid is selected from the group consisting of polyvinyl phosphonic acid, phytic acid, polyvinyl sulfonic acid, polyvinyl methyl ether maleic anhydride copolymer and 2-ethyl hexyl polyphosphoric acid; and said alkali comprises a compound selected from the group consisting of sodium, lithium, potassium and ammonium hydroxide; and said compound (a) comprises a compound selected from the group consisting of sodium, potassium and lithium silicate.

14. The method of claim 12 or 13 further comprising applying a lithographically suitable photosensitive composition to said coating.

15. A method for producing an article comprising treating an aluminum sheet, by electrodepositing a coating on said sheet, said coating comprising a composition produced by the method of (a) admixing a compound selected from the group consisting of silicates, tetraborates and pentaborates having monovalent cations, with (b) the product obtained by titrating an aqueous solution of one or more compounds selected from the group consisting of organic sulfonic, phosphonic, phosphoric and tribasic or higher functionality carboxylic acids with a monovalent alkali until an alkaline pH is attained provided said titration product is selected such that it does not form a precipitate with the compound of part (a).

16. The method of claim 15 wherein said acid is selected from the group consisting of polyvinyl phosphonic acid, phytic acid, polyvinyl sulfonic acid, polyvinyl methyl ether maleic anhydride copolymer and 2-ethyl hexyl polyphoric acid; and said alkali comprises a compound selected from the group consisting of sodium, lithium, potassium and ammonium hydroxide; and said compound (a) comprises a compound selected from the group consisting of sodium, potassium and lithium silicate.

17. The method of claim 15 or 16 further comprising applying a lithographically suitable photosensitive composition to said coating.

18. The method of claim 15 or 16 wherein said electrolysis is conducted in an electrolyte maintained at from about its freezing point to about 90° C., the cathode to anode distance is from about 2 to about 75 cm; a current density of from about 3 to about 30 $A/dm^2$ is applied, and a voltage of from about 1 to about 120 volts is used.

19. The method of claim 18 further comprising applying a lithographically suitable photosensitive composition to said coating.

* * * * *